(12) United States Patent
Noritake

(10) Patent No.: US 7,697,818 B2
(45) Date of Patent: Apr. 13, 2010

(54) DATA PROCESSING DEVICE

(75) Inventor: Toshiya Noritake, Daito (JP)

(73) Assignee: Panasonic Corporation, Kadoma (JP)

( * ) Notice: Subject to any disclaimer, the term of this patent is extended or adjusted under 35 U.S.C. 154(b) by 1223 days.

(21) Appl. No.: 10/549,875

(22) PCT Filed: Mar. 24, 2004

(86) PCT No.: PCT/JP2004/004108

§ 371 (c)(1),
(2), (4) Date: Sep. 16, 2005

(87) PCT Pub. No.: WO2004/088982

PCT Pub. Date: Oct. 14, 2004

(65) Prior Publication Data

US 2006/0182423 A1 Aug. 17, 2006

(30) Foreign Application Priority Data

Mar. 28, 2003 (JP) ............................. 2003-091169

(51) Int. Cl.
*H04N 7/00* (2006.01)
*H04N 5/91* (2006.01)
*H04N 7/26* (2006.01)
*H04N 5/00* (2006.01)

(52) U.S. Cl. ...................... 386/95; 386/46; 386/109; 386/124; 386/125; 386/126

(58) Field of Classification Search .................. 386/46, 386/68, 95, 124–126, 1
See application file for complete search history.

(56) References Cited

U.S. PATENT DOCUMENTS

| 5,649,047 | A | 7/1997 | Takahashi et al. | |
|---|---|---|---|---|
| 6,823,131 | B2 * | 11/2004 | Abelard et al. | 386/68 |
| 6,990,287 | B2 * | 1/2006 | Lin et al. | 386/68 |
| 7,359,620 | B2 * | 4/2008 | Morinaga et al. | 386/95 |

(Continued)

FOREIGN PATENT DOCUMENTS

JP 06-350964 12/1994

(Continued)

OTHER PUBLICATIONS

International Search Report for corresponding PCT/JP2004/004108, mailed, Jul. 13, 2004.

*Primary Examiner*—Marsha D Banks Harold
*Assistant Examiner*—Marc Dazenski
(74) *Attorney, Agent, or Firm*—Renner, Otto, Boisselle & Sklar, LLP

(57) ABSTRACT

A data processor includes: a dummy packet processing section, which makes a plurality of dummy packets, each having a dummy identifier, and generates a playback stream including the dummy packets at predetermined intervals; a detecting section for detecting any of the dummy identifiers by scanning the identifiers of the respective packets of the playback stream and then outputting a first detection signal upon detecting a first code, which specifies a data location of a first portion of a given content, and a second detection signal upon detecting a second code, which specifies a data location of a second portion thereof, respectively; a switch, which receives the playback stream and which selectively passes the content data representing the first portion of the content in accordance with the first and second detection signals; and a decoding section for playing back the first portion of the content based on the output of the switch.

18 Claims, 9 Drawing Sheets

U.S. PATENT DOCUMENTS 7,376,151 B2 * 5/2008 Saeijs et al. ................. 370/473
7,424,203 B2 * 9/2008 Suzuki ....................... 386/68

FOREIGN PATENT DOCUMENTS

| JP | 11-018051 | 1/1999 |
| JP | 2000-287172 | 10/2000 |
| JP | 2000-331421 | 11/2000 |
| JP | 2001-036860 | 2/2001 |

* cited by examiner

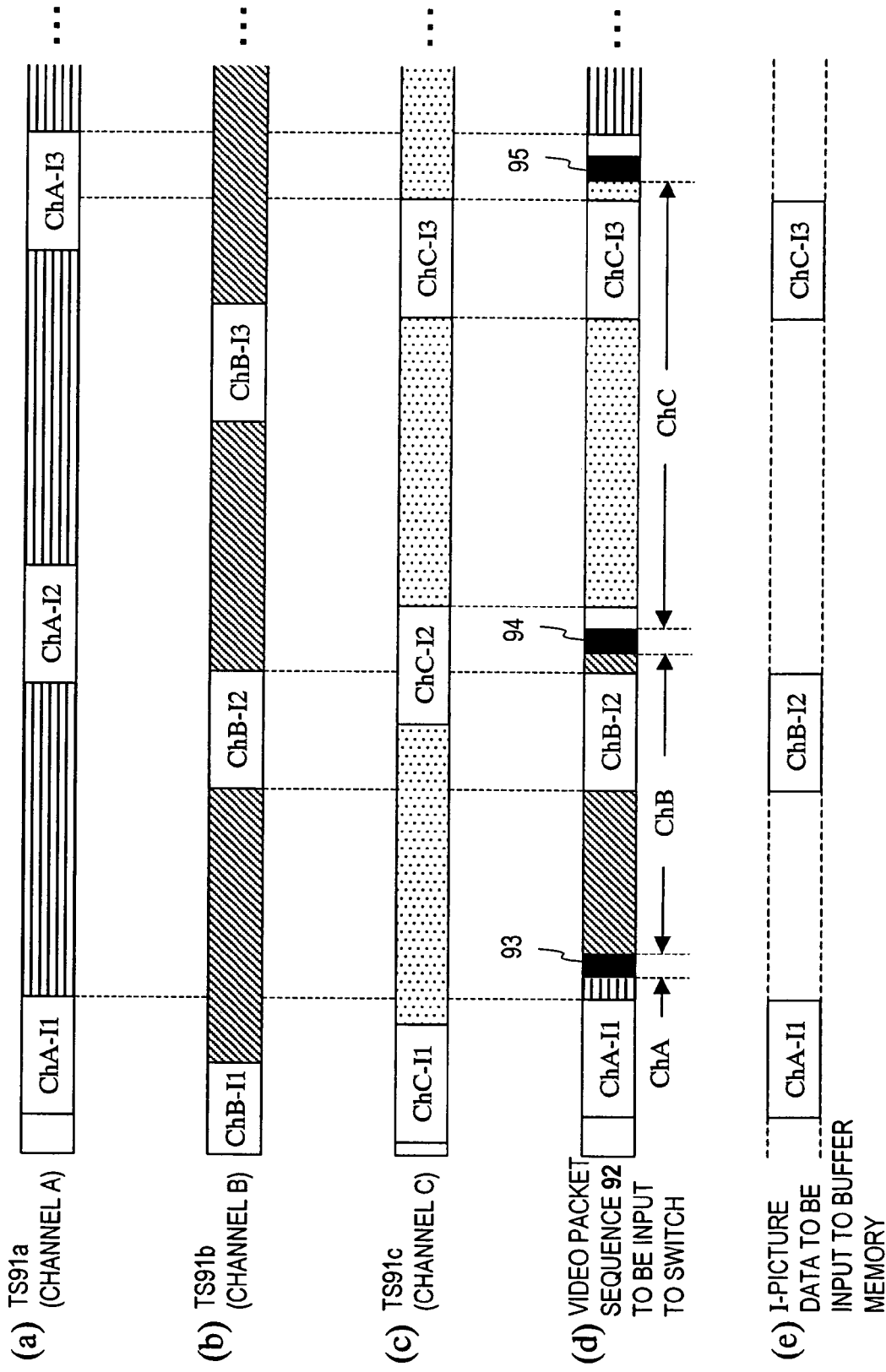

DATA PROCESSING DEVICE

TECHNICAL FIELD

The present invention relates to a technique of playing back video and/or audio from a data stream. More particularly, the present invention relates to a technique that can be used effectively to perform an intermittent playback (such as fast forward playback) of a single data stream or a parallel playback (such as thumbnail playback) of a plurality of streams.

BACKGROUND ART

Recently, as digital technologies have been developed, data representing a video or audio content is more and more often encoded according to an MPEG or any other standard and stored as an encoded data stream on a storage medium such as an optical disk or a hard disk.

In playing back video and audio from a data stream like this, some players can make a special playback of the video and/or audio by extracting a plurality of portions of the data stream and decoding them consecutively. As used herein, the "special playback" includes a fast forward playback and a rewind playback, and the "fast forward playback" includes an intermittent playback that presents pictures (i.e., frames or fields) intermittently.

Hereinafter, it will be described how a high-speed playback may be carried out by extracting data representing an intra-frame coded picture (which will also be referred to herein as an "intra-frame picture" or simply an "I-picture") from a data stream in which video was encoded by a bidirectional predictive coding technique (i.e., a video stream). In a program stream to be used according to the DVD Video standard, the data start and end addresses of a reference frame (which is an I-picture) within the stream are described in the navigation information to be transmitted along with its system header. Accordingly, the player can extract only data representing multiple I-pictures to show, combine them together, and then decode them as a single stream. In that case, only the I-picture data is input to the buffer memory of the player for storing the data stream to decode. As a result, the decoding process can be carried out with no errors, and the intended high-speed playback is realized.

Meanwhile, there are some data streams, in which the start and end addresses of I-picture data are not exactly detectable, unlike the program stream. Examples of those streams include a transport stream (which will be abbreviated herein as "TS"). In making a high-speed playback of an I-picture included in a TS, the I-picture is input so as to be sandwiched between unnecessary preceding and succeeding data. Hereinafter, it will be described with reference to FIG. 1 what problems may arise when I-pictures are played back at high speed with two TS combined together. In this high-speed playback, a number of streams are supposed to be defined as a single playback path according to the given play list.

FIG. 1 shows the data structure of an elementary stream C obtained by combining two transport streams A and B, which were written on an optical disk 10. Each of these TS A and B includes a plurality of transport stream packets (TS packets) A1, A2, An, B1, Bm, etc. As in the TS packet A1, each TS packet is made up of a packet header portion 11 and an elementary data portion 12. I-picture data is supposed to be stored in the respective elementary data portions of the TS packets A2 through An.

The player generates the elementary stream C by reading data from the TS packets of the TS A and B and extracting data from the elementary data portions thereof concurrently. The two TS A and B are combined together at a connection point K. Also, while generating the elementary stream C, the player searches the top stream patterns of the I-picture headers, thereby detecting the I-picture header 13 (e.g., "00_00_01_00_20_08") that has been stored in the elementary data portion $V_{00}$ of the TS packet A2. Thereafter, the player performs a decoding process to play back the I-picture after having detected the I-picture header 13 and before detecting the header code 14 of the next picture (e.g., a B-picture).

However, since there is the connection point K in the elementary stream C, a pseudo I-picture header pattern is generated at that connection point K to cause a decoding error sometimes.

For example, if the last data of the TS packet An, located just before the connection point K, is "00_00" and the first data of the TS packet B1, located right after the connection point K, is "01_00_20_08", then a pseudo I-picture header 15, which happens to have the same pattern ("00_00_01_00_20_08") as the I-picture header 13, is formed. As a result, the player starts to decode the data following the pseudo I-picture header 15 as I-picture data. However, since there is no I-picture data there, a non-decodable data sequence appears in almost all cases. Consequently, a decoding error is produced and the player enters an uncontrollable state due to the abnormal processing.

As a result, another problem arises. Specifically, once a decoding error has happened, initializing processing, including buffer memory clearance, is normally carried out. Accordingly, if the data of the next I-picture has been stored in the buffer memory at that point in time, then that I-picture cannot be presented anymore.

To avoid such an inconvenience, some countermeasure has been taken in the prior art to produce certain effects. In that case, however, it often becomes difficult to decode a plurality of I-pictures continuously, thus possibly further increasing the complexity and load of the processing. For example, in making a special playback of a stream including I-picture data, of which the start and end addresses are not detectable exactly, the conventional player disclosed in Japanese Patent Application Laid-Open Publication No. 2001-36860 continues to input the same data to the decoder while decoding that I-picture data. After having decoded that I-picture data, the player clears the buffer memory and switches the data to input into a data stream including I-picture data to present next.

However, to avoid errors, it is not until this player has decoded a given picture completely that it starts decoding the next picture. Accordingly, it is difficult for the player to decode a plurality of I-pictures continuously. That is to say, it is hard for the player to carry out a decoding process with pictures updated one after another so as not to stop the presentation. In addition, the decoding process needs to be controlled in real time such that the decoding is once stopped before the buffer is cleared and then is resumed after a predetermined amount of data has been accumulated in the buffer memory. Consequently, the complexity and the load of the processing increase inevitably.

An object of the present invention is to decode and play back video and other data quickly and seamlessly from a stream produced by combining a plurality of streams together.

DISCLOSURE OF INVENTION

A data processor according to the present invention receives a data stream, including a plurality of packets, and plays back a content concurrently based on content data stored in the packets. Each packet has an identifier. The content data includes a first code, which specifies a data location of a first portion of the content, and a second code, which specifies a data location of a second portion thereof. The data processor includes: a dummy packet processing section, which makes a plurality of dummy packets, each having a dummy identifier that is different from any of the identifiers of the packets, and which generates a playback stream, including the dummy packets at predetermined intervals, based on the data stream received; a detecting section for detecting any of the dummy identifiers by scanning the identifiers of the respective packets of the playback stream and then outputting a first detection signal upon detecting the first code and a second detection signal upon detecting the second code, respectively; a switch, which receives the playback stream and which selectively passes the content data representing the first portion of the content in accordance with the first and second detection signals; and a decoding section for playing back the first portion of the content based on the output of the switch.

The dummy packet processing section may generate the playback stream by inserting the dummy packets into the data stream at time intervals as defined by the playback duration of a given picture.

After having detected the second code, the detecting section may detect the next dummy identifier by scanning the identifiers of the respective packets.

The data processor may further include an extracting section for continuously extracting, as a plurality of partial streams, a number of portions of at least one data stream from a storage medium on which the data stream is stored. The dummy packet processing section may insert the dummy packet with the dummy identifier into each data location at which two of the partial streams are connected together.

The dummy packet processing section may generate the playback stream by inserting the dummy packet into the data stream upon the detection of the second code.

The data processor may receive at least two data streams, including the data stream and each having the content data about a program, and may further include a channel selecting section for selecting one of the data streams. Upon the detection of the second code, the channel selecting section may switch a first data stream, which has been received until the second code is detected, into a second data stream. The dummy packet processing section may generate a playback stream in which the dummy packet is provided at a data location where the first data stream is switched into the second data stream.

The dummy packet processing section may generate the playback stream by replacing the packets of the first data stream, which follow the packet with the second code, by the dummy packets and then connecting the second data stream to the first data stream.

The data stream may include compressed content data, and the decoding section may play back the first portion of the content by decoding the content data.

The content may be related to video to be presented by switching a plurality of pictures one after another. The content data may have been compressed by a bidirectional predictive coding method. And the detecting section may detect a picture header code of an I-picture as the first code and a picture header code of the next picture, following the I-picture, as the second code, respectively.

The detecting section may detect, as the first code, at least one of a picture header code, a PES header code, a sequence header code, and a group of pictures (GOP) header code, and, as the second code, the same type of code as the first code, respectively.

A data processing method according to the present invention is designed to receive a data stream, including a plurality of packets, and play back a content concurrently based on content data stored in the packets. Each packet has an identifier. The content data includes a first code, which specifies a data location of a first portion of the content, and a second code, which specifies a data location of a second portion thereof. The data processing method includes the steps of: making a plurality of dummy packets, each having a dummy identifier that is different from any of the identifiers of the packets; generating a playback stream, including the dummy packets at predetermined intervals, based on the data stream received; detecting any of the dummy identifiers by scanning the identifiers of the respective packets of the playback stream and then outputting a first detection signal upon detecting the first code and a second detection signal upon detecting the second code, respectively; receiving the playback stream and selectively passing the content data representing the first portion of the content in accordance with the first and second detection signals; and playing back the first portion of the content based on the output of the switch.

The step of generating the playback stream may include generating the playback stream by inserting the dummy packets into the data stream at time intervals as defined by the playback duration of a given picture.

The step of outputting the detection signals may include detecting the next dummy identifier by scanning the identifiers of the respective packets after having detected the second code.

The data processing method may further include the step of continuously extracting, as a plurality of partial streams, a number of portions of at least one data stream from a storage medium on which the data stream is stored. The step of generating the playback stream may include inserting the dummy packet with the dummy identifier into each data location at which two of the partial streams are connected together.

The step of generating the playback stream may include generating the playback stream by inserting the dummy packet into the data stream upon the detection of the second code.

There may be at least two data streams to receive, including the data stream, and each data stream may have the content data about a program. The data processing method may further include the step of selecting one of the data streams. The step of selecting may include switching a first data stream, which has been received until the second code is detected, into a second data stream upon the detection of the second code. The step of generating the playback stream may include generating a playback stream in which the dummy packet is provided at a data location where the first data stream is switched into the second data stream.

The step of generating the playback stream may include generating the playback stream by replacing the packets of the first data stream, which follow the packet with the second code, by the dummy packets and then connecting the second data stream to the first data stream.

The data stream may include compressed content data, and the step of playing may include playing back the first portion of the content by decoding the content data.

The content may be related to video to be presented by switching a plurality of pictures one after another. The content data may have been compressed by a bidirectional predictive coding method. The step of outputting the detection signals may include detecting a picture header code of an I-picture as the first code and a picture header code of the next picture, following the I-picture, as the second code, respectively.

The step of outputting the detection signals may include detecting, as the first code, at least one of a picture header code, a PES header code, a sequence header code, and a group of pictures (GOP) header code, and, as the second code, the same type of code as the first code, respectively.

A data processing program according to the present invention is executable by a computer and is designed to receive a data stream, including a plurality of packets, and play back a content concurrently based on content data stored in the packets. Each packet has an identifier. The content data includes a first code, which specifies a data location of a first portion of the content, and a second code, which specifies a data location of a second portion thereof. Following this program, a data processor with a built-in computer performs the steps of: making a plurality of dummy packets, each having a dummy identifier that is different from any of the identifiers of the packets; generating a playback stream, including the dummy packets at predetermined intervals, based on the data stream received; detecting any of the dummy identifiers by scanning the identifiers of the respective packets of the playback stream and then outputting a first detection signal upon detecting the first code and a second detection signal upon detecting the second code, respectively; receiving the playback stream and selectively passing the content data representing the first portion of the content in accordance with the first and second detection signals; and playing back the first portion of the content based on the output of the switch.

Figure 4:
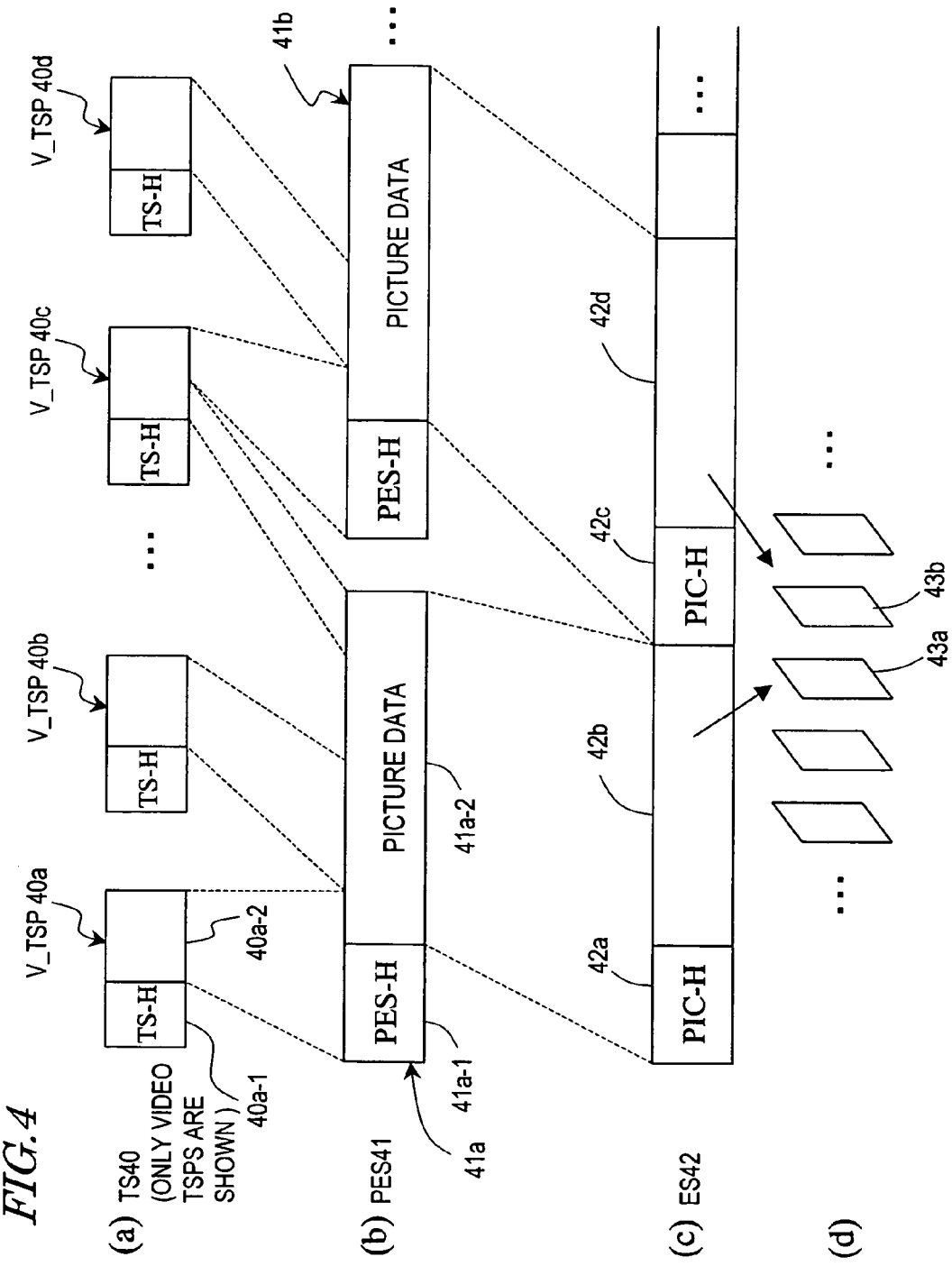

Portions (a) to (d) of FIG. 4 show a stream correlation to be established when video pictures are played back from video TS packets.

Figure 5:
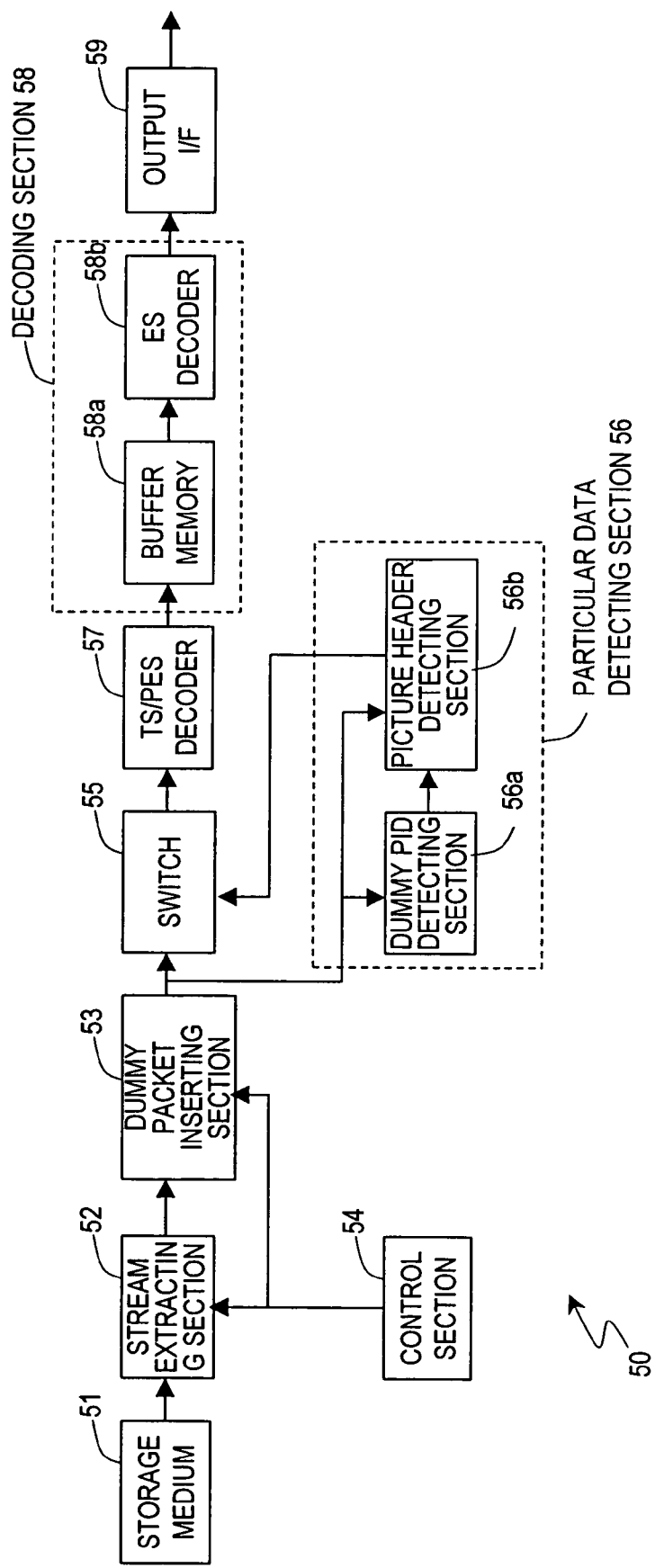

FIG. 5 shows an arrangement of functional blocks in a data processor 50 according to a first preferred embodiment.

Figure 6:
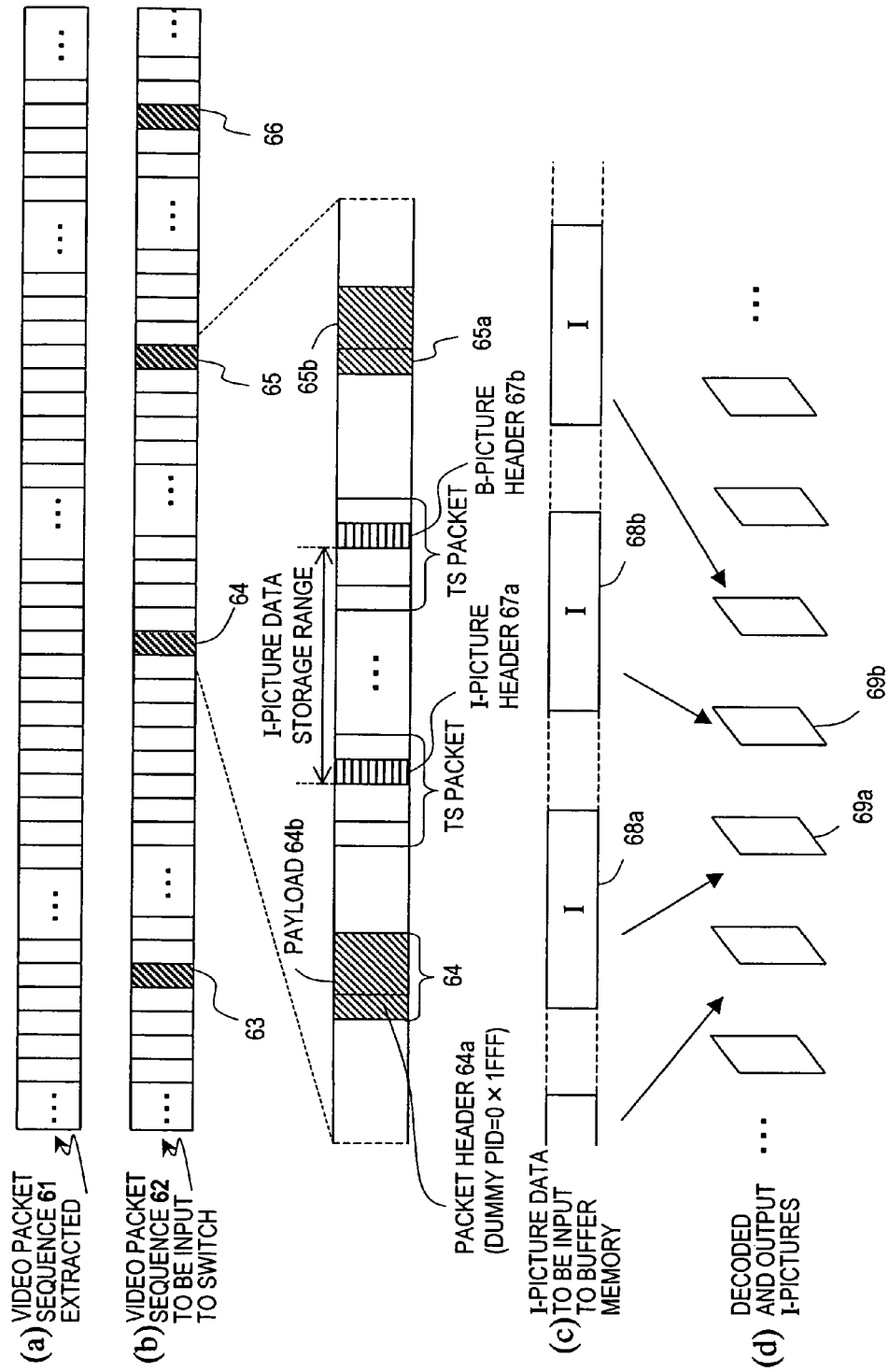

Portion (a) of FIG. 6 shows a video TS packet sequence 61 extracted by a stream extracting section 52.

Portion (b) of FIG. 6 shows a video packet sequence (playback stream) 62 to be input to a switch 55 after having gone through the processing by a dummy packet inserting section 53.

Portion (c) of FIG. 6 shows I-picture data to be input to a buffer memory 58a.

Portion (d) of FIG. 6 shows a group of I-pictures that are going to be decoded and output.

Figure 7:
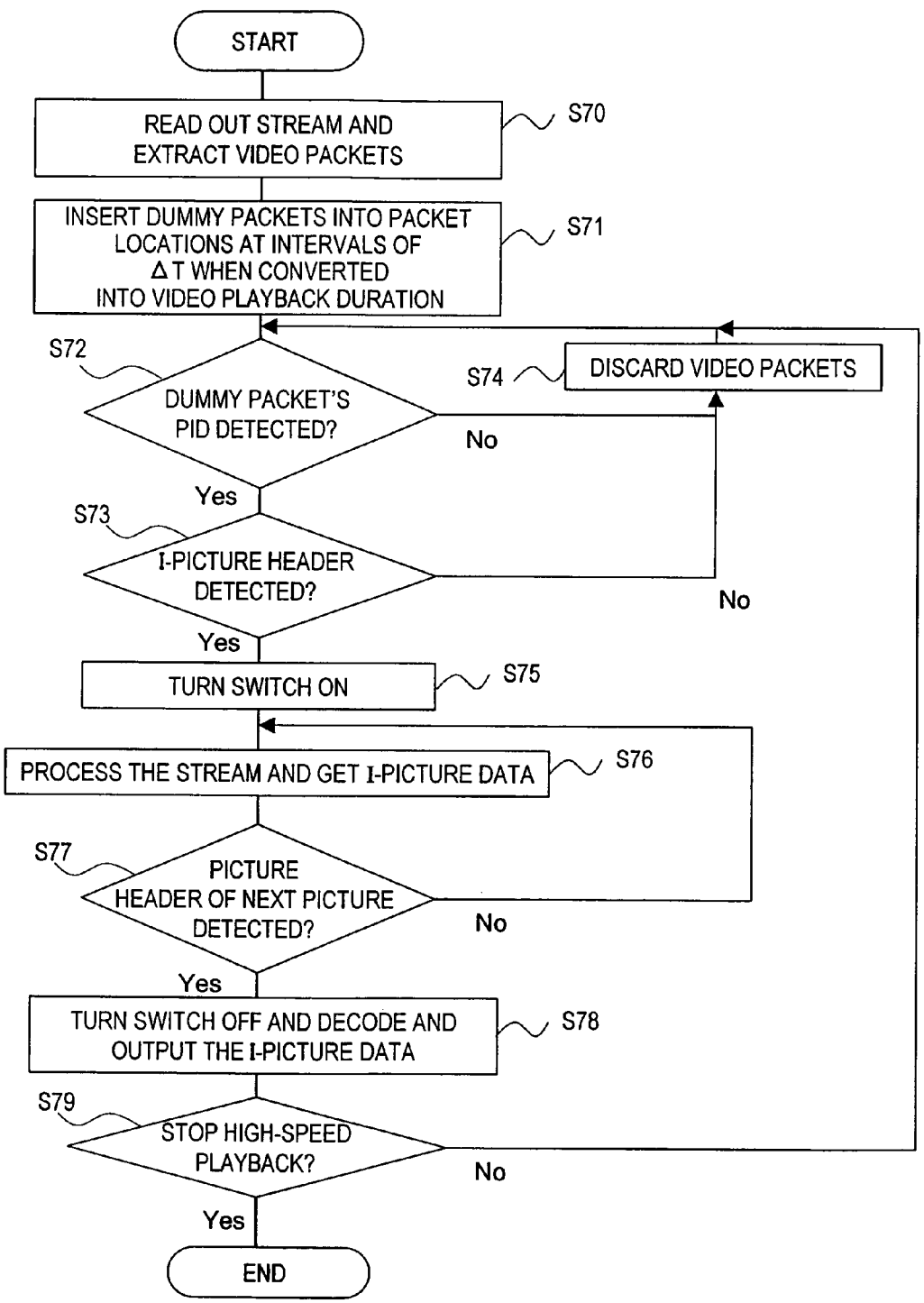

FIG. 7 is a flowchart showing the procedure of processing done by the data processor 50.

Figure 8:
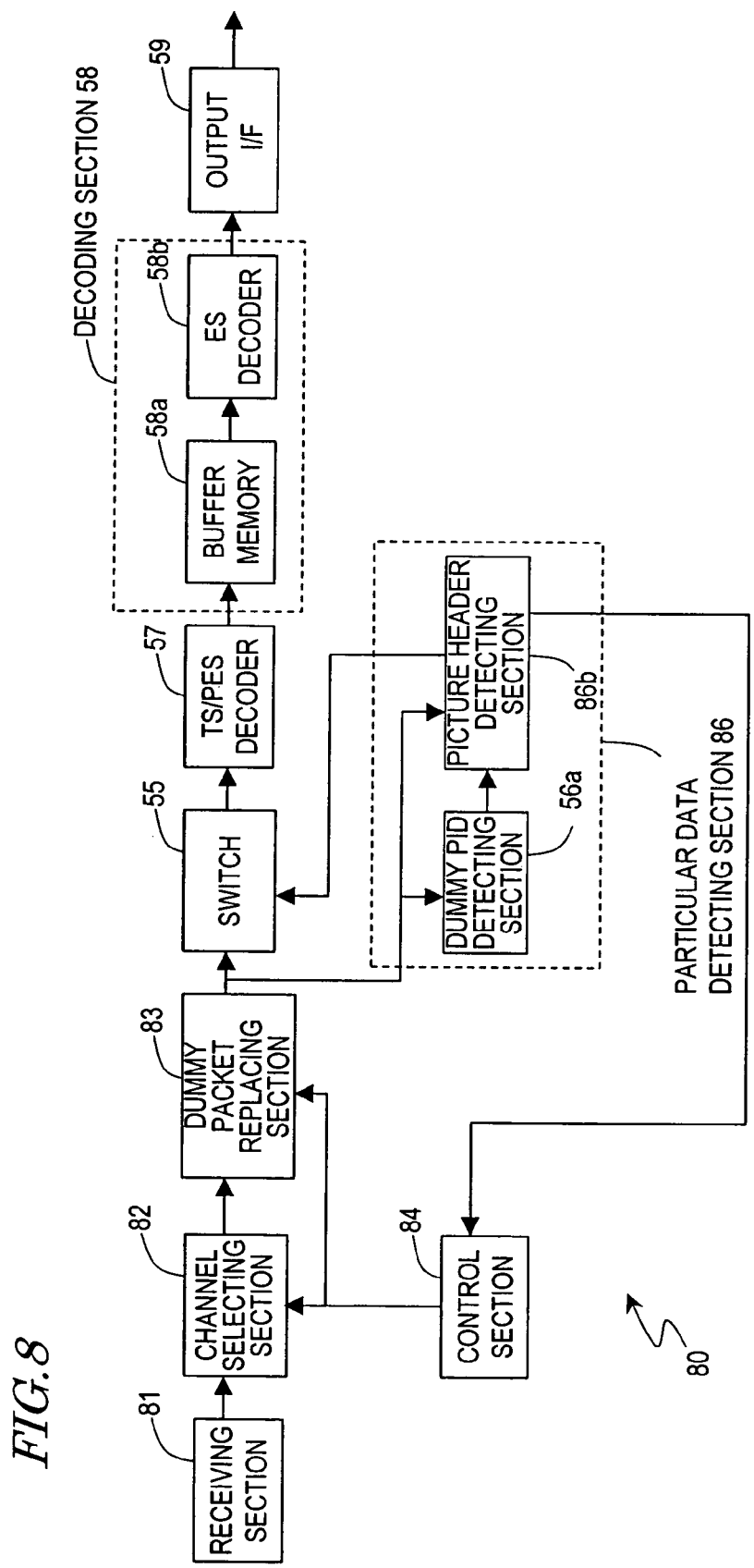

FIG. 8 shows an arrangement of functional blocks in a data processor 80 according to a second preferred embodiment.

Portions (a) through (e) of FIG. 9 show preceding and succeeding data sequences to be processed by the data processor 80 of the second preferred embodiment.

BEST MODE FOR CARRYING OUT THE INVENTION

Hereinafter, preferred embodiments of the present invention will be described with reference to the accompanying drawings.

Embodiment 1

First of all, the data structure of a data stream to be processed by a data processor according to this preferred embodiment will be described. After that, the configuration and operation of the data processor will be described.

Figure 2:
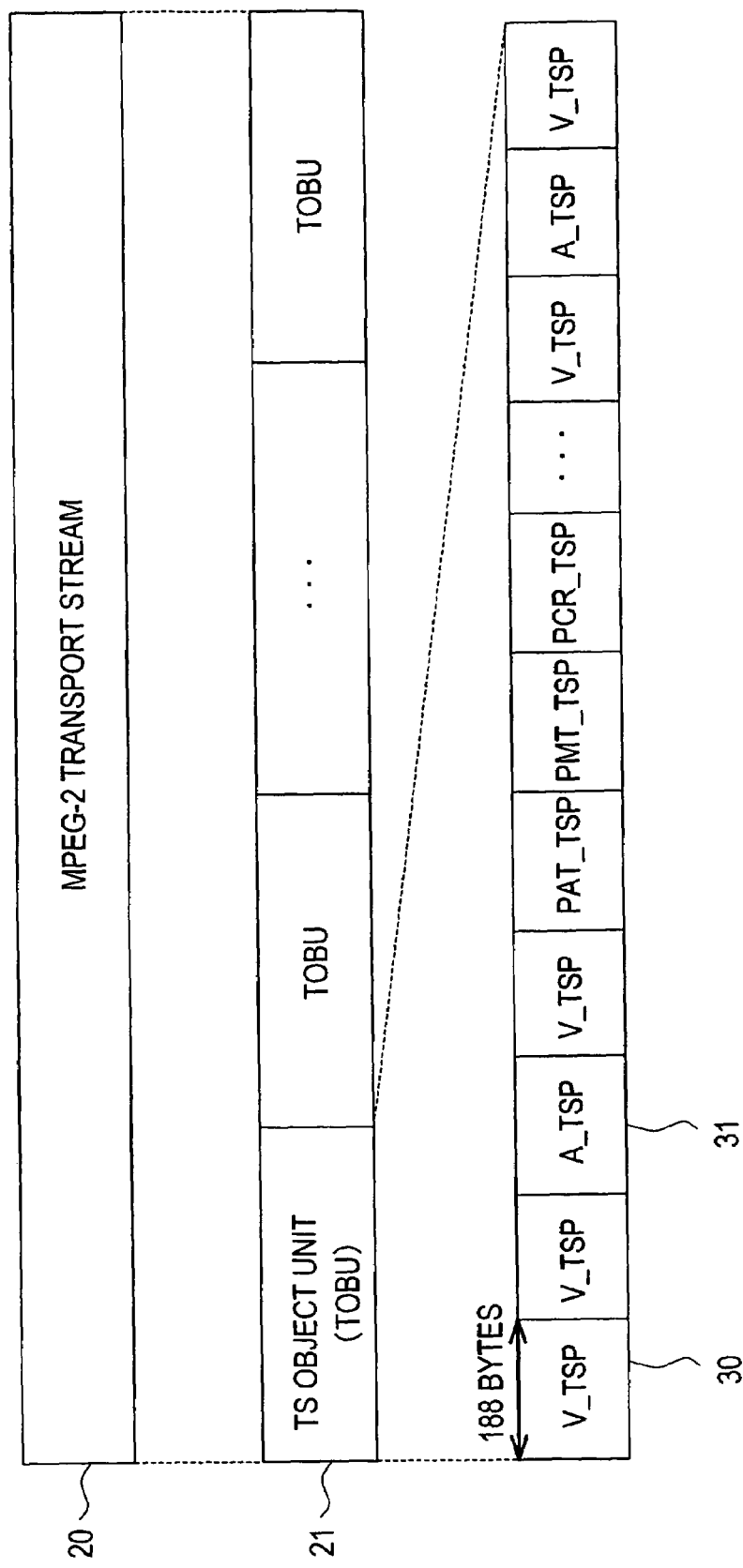
FIG. 2 shows the data structure of an MPEG-2 transport stream 20.

FIG. 2 shows the data structure of an MPEG-2 transport stream 20. The MPEG-2 transport stream 20 (which will be referred to herein as "TS 20") includes a plurality of TS object units (TOBUs) 21, each of which includes at least one transport packet (TS packet). Examples of those TS packets include a video TS packet (V_TSP) 30 in which compressed video data is stored, an audio TS packet (A_TSP) 31 in which compressed audio data is stored, a packet (PAT_TSP) in which a program association table (PAT) is stored, a packet (PMT_TSP) in which a program map table (PMT) is stored, and a packet (PCR_TSP) in which a program clock reference (PCR) is stored. Each of these packets has a data size of 188 bytes.

Hereinafter, the video TS packets and audio TS packets, which are relevant to the processing of the present invention, will be described. Since packets of the other types have nothing direct to do with the processing of the present invention, the description thereof will be omitted herein.

Figure 3:
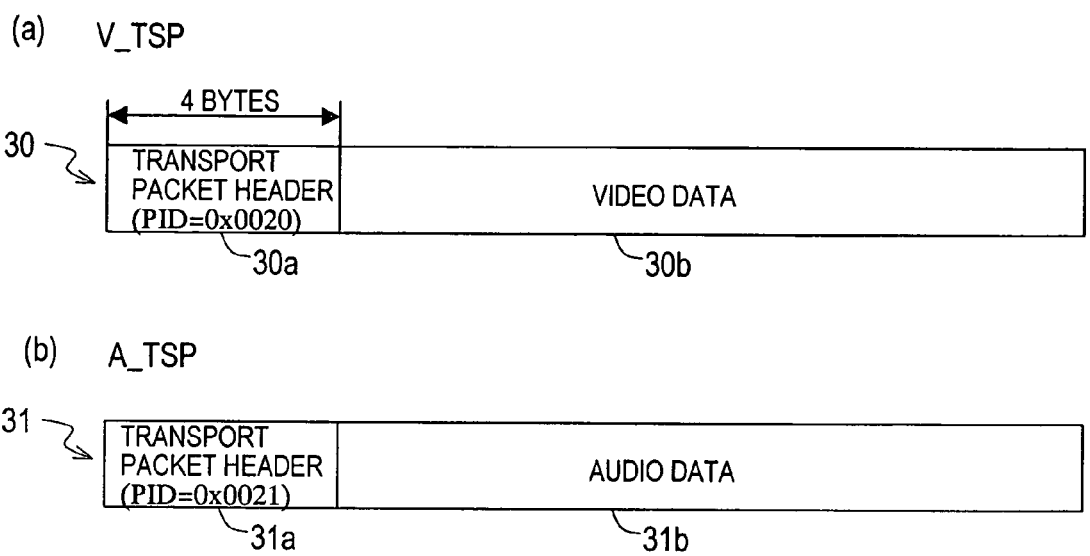
FIG. 3(a) shows the data structure of a video TS packet 30.
FIG. 3(b) shows the data structure of an audio TS packet 31.

FIG. 3(a) shows the data structure of a video TS packet 30. The video TS packet 30 includes a transport packet header 30a of 4 bytes and video data 30b of 184 bytes. On the other hand, FIG. 3(b) shows the data structure of an audio TS packet 31. The audio TS packet 31 also includes a transport packet header 31a of 4 bytes and audio data 31b of 184 bytes.

As can be seen from this example, a TS packet is usually made up of a transport packet header of 4 bytes and elementary data of 184 bytes. In the packet header, a packet ID (PID) showing the type of that packet is described. For example, the PID of a video TS packet is 0x0020, while that of an audio TS packet is 0x0021. The elementary data may be content data such as video data or audio data or control data for controlling the playback. The type of the data stored there changes according to the type of the packet. It should be noted that the data storage area of a TS packet, following the TS packet header, is called a "payload" when content data such as video data or audio data is stored there and an "adaptation field" when control data is stored there, respectively. The prime feature of the processing of this preferred embodiment lies in the processing that uses the payload of a TS packet.

FIGS. 2, 3(a) and 3(b) show an exemplary data structure of a transport stream. However, this data structure is equally applicable to packs included in a program stream because data also follows a packet header in a pack. A "pack" is known as an exemplary form of a packet. Nevertheless, the pack is different from the packet in that a pack header is additionally provided before the packet header and that the pack has a data size of 2,048 kilobytes.

The following preferred embodiment of the present invention will be described herein as being applied to video processing.

Portions (a) to (d) of FIG. 4 show a stream correlation to be established when video pictures are played back from video TS packets. As shown in portion (a) of FIG. 4, this TS 40 includes video TS packets 40a through 40d. Although the TS 40 may include other packets, only those video TS packets are shown here. A video TS packet can be easily identifiable by the PID stored in its header 40a-1.

A packetized elementary stream is made up of the video data of respective video TS packets such as the video data 40a-2. Portion (b) of FIG. 4 shows the data structure of a packetized elementary stream (PES) 41. The PES 41 includes a plurality of PES packets 41a, 41b, etc. The PES packet 41a is made up of a PES header 41a-1 and picture data 41a-2. These data are stored as the video data of the video TS packets.

The picture data 41a-2 includes the data of respective pictures. An elementary stream is made up of those picture data 41a-2. Portion (c) of FIG. 4 shows the data structure of an elementary stream (ES) 42. The ES 42 includes multiple pairs of picture headers and frame or field data. It should be noted that although the "picture" is generally used as a term that may refer to either a frame or a field, the "picture" is supposed herein to be a frame.

In the picture header 42a shown in portion (c) of FIG. 4, a picture header code, showing the picture type of the following frame data 42b, is described. In the same way, a picture header code, showing the picture type of the following frame data 42d, is described in the picture header 42c. The "type" is one of an I-picture (I-frame), a P-picture (P-frame) and a B-picture (B-frame). If the type shows this is an I-frame, its picture header code may be "00_00_01_00_20_08", for example.

The frame data 42b, 42d, etc. is data corresponding to a single frame, which may consist of either that data only or that data and preceding/succeeding data to be decoded before and/or after the former data. For example, portion (d) of FIG. 4 shows a picture 43a consisting of the frame data 42b and a picture 43b consisting of the frame data 42d. The data processor to be described below acquires the TS packets 40a, etc., carries out system decoding on the acquired TS packets down to the elementary stream, and then outputs decoded pictures.

Hereinafter, a data processor according to this preferred embodiment will be described with reference to FIG. 5, which shows an arrangement of functional blocks in the data processor 50 of this preferred embodiment. The data processor 50 has the function of receiving a TS, which is made up of a plurality of packets, while playing back a content based on the content data stored in those packets. The "playback" may refer to a normal playback in which video and audio are played back exactly at the output timings intended by the producer of that content or a special playback such as a fast-forward playback or a rewind playback. In this preferred embodiment, however, a fast-forward playback operation using I-pictures in a TS will be mainly described.

The data processor 50 includes a storage medium 51, a stream extracting section 52, a dummy packet inserting section 53, a control section 54, a switch 55, a particular data detecting section 56, a TS/PES decoder 57, a decoding section 58 and an output interface 59.

By using these components, the data processor 50 operates mainly as follows. Specifically, in this data processor 50, the stream extracting section 52 extracts a video TS packet. Next, the dummy packet inserting section 53 makes a plurality of dummy packets, each having a dummy packet identifier (PID) that is different from any of the IDs of the video TS packet and other packets, and inserts the dummy packets at predetermined intervals into the TS, thereby generating a playback stream. Subsequently, on detecting the dummy PID by scanning the PIDs of respective packets of the playback stream, the particular data detecting section 56 searches for the picture header code of an I-picture next. And on finding the I-picture header code, the particular data detecting section 56 closes the switch 55 by outputting a detection signal thereto and selectively passes the I-picture data.

The particular data detecting section 56 is still searching for a picture header. And on detecting the header code of the next picture (e.g., a B-picture) that follows the I-picture, the particular data detecting section 56 judges that the I-picture data has been received fully and closes the switch 55 by outputting a detection signal thereto. As a result, the switch 55 can selectively pass only the I-picture data required for the playback operation. The I-picture data is subjected to a predetermined decoding process and then output as a picture. By outputting only I-pictures in this manner, pictures are presented intermittently and a fast-forward playback is realized.

Hereinafter, the respective components of the data processor 50 will be described more fully. As to this preferred embodiment, the functions of those components of the data processor 50 will be described as being mainly applied to video playback as mentioned above.

The storage medium 51 is a medium, on which a TS, including data about video, audio or any other content, such as that shown in FIG. 2 or 4 is written and stored, and may be a hard disk, for example. A drive including a motor for spinning the hard disk and a magnetic head is needed to read and write data from/on the storage medium 51 but is not shown in FIG. 5. Alternatively, the storage medium 51 may also be a removable medium such as an optical disk. In that case, the storage medium 51 does not have to be a component belonging to the data processor 50.

The stream extracting section 52 receives a TS and extracts video TS packets from the packets, of which the TS is made up, by reference to the PIDs. In this case, either a single TS or a plurality of TS may be received. For example, if a playback operation is carried out in accordance with a play list that specifies a video playback path covering a plurality of TS, then the stream extracting section 52 extracts respective video TS packets from those TS that are needed for the playback.

The dummy packet inserting section 53 inserts dummy packets into the extracted video TS packets at predetermined intervals. As used herein, the "dummy packet" is a data sequence (or packet), which does not include any data of the content to be played back but functions as a marker in the TS. The dummy packet is given a uniquely identifiable PID, which is different from that of a video TS packet, an audio TS packet or any other TS packet. A more specific structure thereof will be described later.

The dummy packet inserting section 53 may insert the dummy packets at such intervals that I-picture data is always included in video TS packets between every pair of adjacent dummy packets, for example. Generally speaking, if video is compressed so as to comply with the MPEG-2 standard, I-pictures are provided every 0.5 second in playback duration. Accordingly, the dummy packet inserting section 53 may insert the dummy packets at intervals corresponding to the I-picture intervals.

Figure 1:
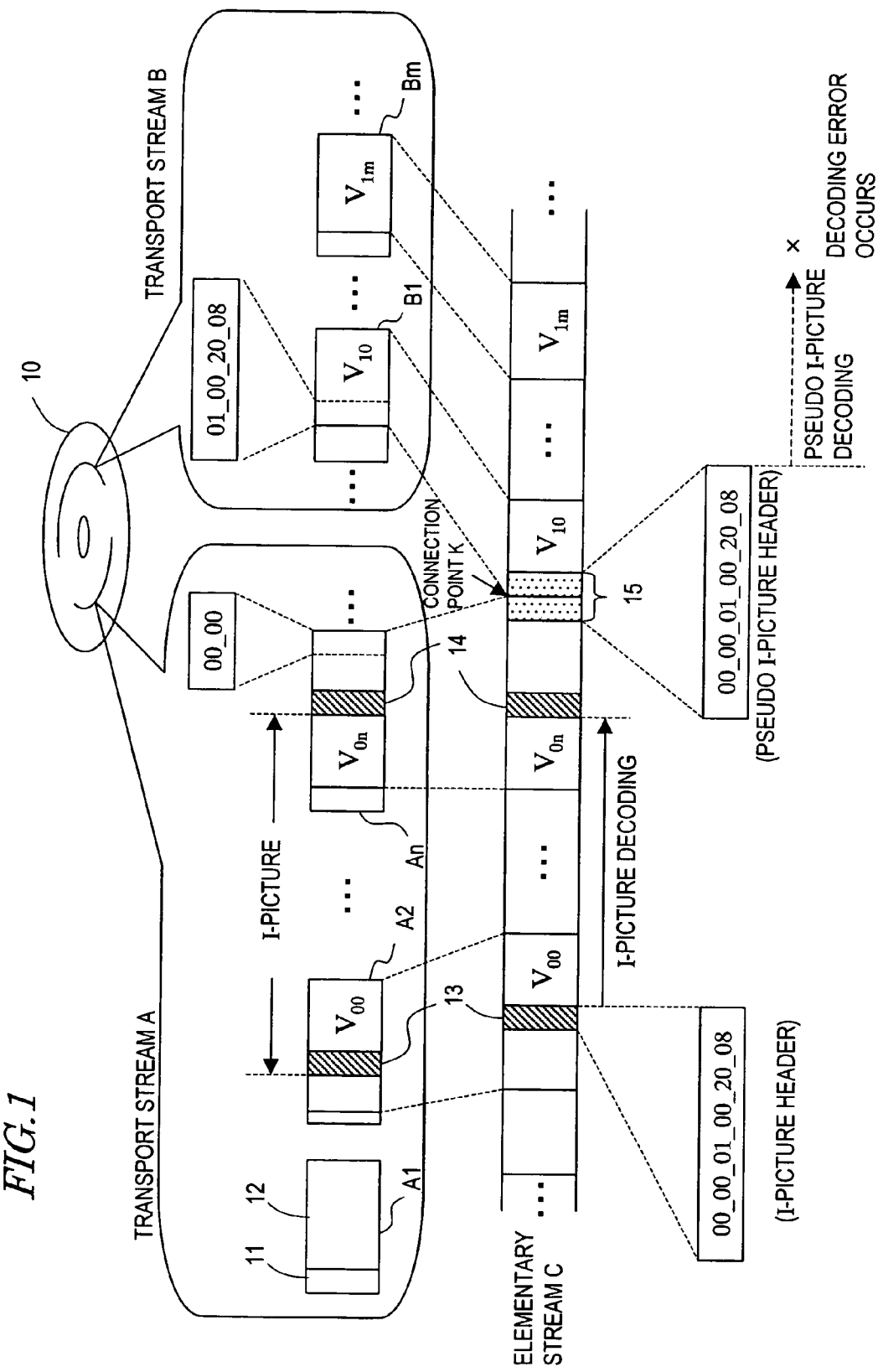
FIG. 1 shows the data structure of an elementary stream C obtained by combining two transport streams A and B, which were written on an optical disk 10.

In performing a playback operation using a plurality of TS in accordance with a play list, the dummy packet inserting section 53 inserts a dummy packet into each connection point between the TS, i.e., to a location where one TS is switched into another. Consequently, unlike the situation already described with reference to FIG. 1, it is possible to prevent the pseudo I-picture header from being detected erroneously as a real I-picture header at the connection point.

In the following description, a data stream, into which the dummy packet inserting section 53 has inserted those dummy packets, will also be referred to herein as a "playback stream" for convenience sake.

The control section 54 controls the operations of the stream extracting section 52 and the dummy packet inserting section 53. Specifically, on receiving a high-speed playback command from the user of this data processor 50, the control section 54 tells the stream extracting section 52 what TS to receive and the PIDs of the TS packets to extract. The control section 54 also tells the dummy packet inserting section 53 the timings to insert the dummy packets. Even in reading a plurality of TS, the control section 54 knows where the TS is switched and can instruct the dummy packet inserting section 53 to insert the dummy packet to that TS switching point. In instructing the insertion of a dummy packet into a TS, the control section 54 delays the acquisition of the next data for an amount of time, corresponding to the data size of the dummy packet, according to the data rate of that TS. In this manner, the TS packet can be inserted into that TS.

The switch 55 is connected to the dummy packet inserting section 53 so as to receive the playback stream in parallel with the switch 55 and to selectively connect or disconnect the signal path in response to the output signal of the particular data detecting section 56. More specifically, the switch 55 receives a first detection signal and a second detection signal (to be described later) from the particular data detecting section 56. For example, the switch 55 may connect the signal path on receiving the first detection signal and disconnect the signal path on receiving the second detection signal, respectively. Accordingly, in the interval between the reception of the first detection signal and that of the second detection signal, the signal path is connected such that the playback stream is transmitted to the following components. Optionally, an FIFO buffer, of which the capacity is small enough to store the picture headers, may be provided for the switch 55. In that case, after the playback stream has been temporarily stored in the buffer and after the first detection signal has been received, the playback stream may start being transmitted from the top of the picture header detected at that point in time.

The particular data detecting section 56 is also connected to the dummy packet inserting section 53 and receives the playback stream, too. The particular data detecting section 56 includes a dummy PID detecting section 56a and a picture header detecting section 56b. The dummy PID detecting section 56a receives the playback stream and scans the PIDs of respective packets that form the playback stream. And on detecting the PID of a dummy packet, the dummy PID detecting section 56a outputs a dummy PID detection signal.

On the other hand, the picture header detecting section 56b receives the playback stream and the dummy PID detection signal. On receiving the dummy PID detection signal, the picture header detecting section 56b analyzes the respective packets, which make up the playback stream, thereby checking the picture header code stored in the picture header (see FIG. 4(c)). As a result, the picture header detecting section 56b outputs the first detection signal when detecting an I-picture header code and outputs the second detection signal when detecting the picture header code of the next picture after having detected the I-picture header code. That is to say, this means that after the first detection signal has been output and before the second detection signal is output, the particular data detecting section 56 and the switch 55 receive packets including the data about I-pictures of the playback stream. The first and second detection signals are sent to the switch 55.

The TS/PES decoder 57 receives the playback stream from the switch and deletes the packet header, PES header and so on from the stream. In the example shown in portions (a) and (b) of FIG. 4, the TS/PES decoder 57 deletes the header 40a-1 from the TS packet 40a. Furthermore, if the payload 40a-2 of the TS packet 40a includes the PES packet header 41a-1, then the TS/PES decoder 57 deletes the PES packet header 41a-1, too. As a result, only picture data such as the picture data 41a-2 is extracted from the playback stream that the TS/PES decoder 57 has received. And the TS/PES decoder 57 outputs the picture data.

The decoding section 58 includes a buffer memory 58a and an elementary stream decoder (ES decoder) 58b. The buffer memory 58a receives the picture data from the TS/PES decoder 57 and temporarily stores it. When the data (i.e., elementary data) accumulated in the buffer memory 58a reaches an amount large enough to make one picture, the ES decoder 58b decodes and outputs that data.

The output interface 59 outputs a video signal to an external device such as a TV set.

Hereinafter, it will be described with reference to portions (a) through (d) of FIG. 6 how the data stream that was written on the storage medium 51 is processed by the respective components described above.

Portion (a) of FIG. 6 shows a video TS packet sequence 61 extracted by the stream extracting section 52. Each box represents a single video TS packet.

Next, portion (b) of FIG. 6 shows a video packet sequence (playback stream) 62 to be input to the switch 55 after having gone through the processing by the dummy packet inserting section 53. The dummy packet inserting section 53 inserts dummy packets 63, 64, 65, 66, etc., each having a dummy PID, at the timings mentioned above. The detailed structures of the dummy packets 64 and 65 are also shown in portion (b) of FIG. 6.

The dummy packet 64 includes a packet header 64a, to which 0x1FFF, for example, was given as a dummy PID, and a payload 64b. In the payload 64b, dummy data represented by 0xE, for example, is stored to show the identity as a dummy packet. There is at least one TS packet, on which I-picture data is stored, between the dummy packets 64 and 65. Accordingly, an I-picture header 67a is included in the payload of a particular TS packet that follows the dummy packet 64. After that, the I-picture data is stored in at least one TS packet.

The I-picture data is followed by a TS packet in which the picture data of another type of picture (which is supposed to be a B-picture in this example) is stored. Accordingly, a B-picture header 67b is also included in the payload of another particular TS packet between the dummy packets 64 and 65. After that, the dummy packet 65, including a packet header 65a to which a dummy PID was given and a payload 65b, is arranged. During a high-speed playback operation in which only I-pictures are played back, all picture data other than the data about those I-pictures is unnecessary and is treated as unnecessary data.

It should be noted that if the video packet sequence 61 shown in portion (a) of FIG. 6 is a data stream obtained by extracting portions of a plurality of TS consecutively (e.g., when the playback operation is carried out in accordance with a play list), then at least one of the dummy packets 63, 64, 65, 66, etc. may be a packet inserted into an associated connection point. In order to distinguish the dummy packets inserted at predetermined intervals and the dummy packets inserted into the connection points, those dummy packets may have mutually different payload values. For example, if the former dummy packets have a payload value of 0xE, then the latter dummy packets may have a payload value of 0xF. After the dummy PID detecting section 56*a* has detected the dummy PID from a TS packet of the playback stream and then the value 0xE or 0xF, the data size of every TS packet is constant at 188 bytes. By taking advantage of this feature, the dummy PID detecting section 56*a* can omit the analysis of the payload that follows.

After the dummy PID has been detected, the picture header detecting section 56*b* begins to search for an I-picture header code with the TS packet that follows the dummy packet. The picture header detecting section 56*b* can also easily identify the TS packets, following the dummy packet, by the data sizes of those TS packets. However, to prevent the picture header detecting section 56*b* from taking a pseudo I-picture header code for a real I-picture header code by mistake, its operation is preferably reset after the dummy PID has been detected and before the data in the next TS packet starts to be searched. Then, the picture header detecting section 56*b* can start analyzing the TS packet following the dummy packet without being affected by the data already received.

Next, portion (c) of FIG. 6 shows the I-picture data to be input to the buffer memory 58*a*. The video packet sequence 62 shown in portion (b) of FIG. 6 is input to not only the switch 55 but also the particular data detecting section 56 in parallel. Accordingly, as a result of the operations of the particular data detecting section 56, switch 55 and TS/PES decoder 57, the buffer memory 58*a* can receive only the I-picture data 68*a*, 68*b*, etc. Portion (d) of FIG. 6 shows the group of I-pictures that are going to be decoded and output. The decoding section 58 decodes the I-picture data 68*a*, 68*b*, etc. stored in the buffer memory 58*a* and outputs them as either frame pictures or field pictures.

Hereinafter, the processing done by the data processor 50 will be described. First, the data processor 50 can perform a normal playback process by using the components described above. The normal playback of video is carried out roughly as follows. The stream extracting section 52 extracts a TS, made up of video or audio TS packets, sorts the packets into respective types by the PIDs of the packets and then passes them to the TS/PES decoder 57. In response, the TS/PES decoder 57 deletes various types of headers from them and extends the picture data, including I-pictures, P-pictures and B-pictures, in the buffer memory 58*a*. Then, the ES decoder 58*b* decodes them. As a result, the pictures are output exactly in the order in which they were produced, and the video is played back.

Next, it will be described with reference to FIG. 7 how the data processor 50 performs a special playback process. The process to be described below is a special playback process that starts when the user of the data processor 50 instructs the data processor 50 to perform a fast-forward playback (i.e., high-speed playback) operation.

FIG. 7 shows the procedure of the processing done by the data processor 50. First, when the control section 54 receives a request to start a high-speed playback from the user, the stream extracting section 52 reads out a data stream (TS) stored in the storage medium 51 and extracts a video packet in Step S70. Next, in Step S71, the dummy packet inserting section 53 inserts dummy packets into packet locations at regular intervals, which are equivalent to the amount of time Δt when converted into a video playback duration. As a result, a playback stream can be obtained. The amount of time Δt is an interval at which the I-pictures appear and may be 0.5 second, for example. It should be noted that if an apparently single TS is formed by reading a plurality of TS, then the dummy packet inserting section 53 inserts the dummy packets into the respective connection points, thereby obtaining the playback stream. The playback stream is output to the switch 55 and the particular data detecting section 56. At this point in time, however, the switch 55 is still open and the playback stream is stopped at the switch 55.

Next, in Step S72, the dummy PID detecting section 56*a* analyzes the given playback stream, thereby determining whether or not the detecting section 56*a* has detected a dummy PID. This processing step means searching for the dummy packets 63, 64, etc. shown in portion (b) of FIG. 6. The dummy PID detecting section 56*a* scans the packet header of each TS packet to determine whether its PID is a particular dummy PID or not.

If it turns out that the dummy PID detecting section 56*a* has detected a dummy PID, then the detecting section 56*a* outputs a dummy PID detection signal and the processing advances to the next step S73. Otherwise, the processing advances to Step S74. In Step S74, since the switch 55 is still left open, the video TS packets of the playback stream are not transmitted to the following stages but are discarded.

In Step S73, on receiving the dummy PID detection signal, the picture header detecting section 56*b* analyzes the given playback stream, thereby determining whether or not the detecting section 56*b* has detected the picture header of an I-picture. The picture header detecting section 56*b* makes this decision by determining whether or not the picture header code matches the I-picture header code. In portion (b) of FIG. 6, for example, the picture header detecting section 56*b* detects the I-picture header 66 by sensing the I-picture header code.

If it turns out that the picture header detecting section 56*b* has detected the I-picture header, then the detecting section 56*b* outputs the first detection signal and the processing advances to the next Step S75. Otherwise, the processing goes back to Step S74 described above, in which the TS packet of the playback stream is discarded.

In Step S75, on receiving the first detection signal, the switch 55 connects the signal path, thereby starting to transmit the playback stream to the TS/PES decoder 57 as the next block. As a result, TS packets, including the picture data (i.e., elementary data) of I-pictures, start to be transmitted to the TS/PES decoder 57. Then, in Step S76, the TS/PES decoder 57 removes the TS packet headers and PES headers from the playback stream, thereby gradually generating elementary data of the I-pictures (see portion (c) of FIG. 4) and sending it to the buffer memory 58*a*.

While performing these processing steps S75 and S76, the picture header detecting section 56*b* continues to analyze the playback stream in Step S77, thereby determining whether or not the detecting section 56*b* has detected the picture header of the next picture. This detection is also carried out based on the picture header code. In portion (b) of FIG. 6, for example, the picture header detecting section 56*b* detects a B-picture header 67 by sensing a B-picture header code.

If it turns out that the picture header detecting section 56*b* has detected the B-picture header that follows, then the detecting section 56*b* outputs the second detection signal and the processing advances to the next step S78. Otherwise, the processing goes back to the previous step S76, in which I-picture data is continuously acquired from the playback stream.

In Step S78, on receiving the second detection signal, the switch 55 blocks the signal path, thereby discarding the remaining TS packets of the playback stream. At this point in time, only the picture data of a single I-picture has been stored in the buffer memory 58*a*. Thereafter, the ES decoder 58*b* decodes and outputs the I-picture data. It should be noted that the ES decoder 58*b* decodes only the I-picture data. Thus, the ES decoder 58*b* never decodes any pseudo I-picture as described with reference to FIG. 1. That is why no decoding errors should occur, either. After that, the processing advances to the next step S79.

In Step S79, it is determined whether or not the high-speed playback should be continued. For example, if the user has instructed the control section 54 to stop the high-speed playback, then the control section 54 ends the processing shown in FIG. 7. On the other hand, if no instruction of stopping the high-speed playback has been received yet, then the processing goes back to Step S72, in which the next dummy PID starts to be searched for.

The dummy PID is searched for because the dummy PID could be detected very quickly and the next I-picture data could be reached swiftly. More specifically, to obtain the picture data of the next I-picture, the picture header code of that I-picture may be detected simply by analyzing the playback stream. However, since the picture header code is stored in the video data area of a TS packet, the video data area of every video TS packet that follows needs to be analyzed. Each video data area has a data size of 184 bytes. On the other hand, the dummy PID is stored in the packet header of a TS packet. The packet header has a data size of 4 bytes (see FIGS. 3(a) and 3(b)). Accordingly, compared with analyzing the video data area, the PID search would take a much shorter time and far lighter processing load. Consequently, the next I-picture data, which follows the next dummy packet, can be reached in a far shorter time and with a much lighter load.

By performing these processing steps, only the picture data of I-pictures can be obtained just as intended as shown in portions (b) and (c) of FIG. 6. Since no decoding errors should occur and there is no need to clear the buffer memory 58a unlike the conventional technique, the I-pictures can be played back continuously and quickly by acquiring the I-picture data consecutively. In addition, as no unnecessary data is stored in the buffer memory 58a, the buffer for use in the special playback may have a small capacity.

The processing shown in FIG. 7 has been described on the supposition that the headers and packets are arranged in the playback stream in the order of an I-picture header (with I-picture data), a B-picture header and a dummy packet. However, depending on the timing at which the dummy packet is inserted, the I-picture header and I-picture data may be immediately followed by the dummy packet inserted and the B-picture header of that example may be preceded by the dummy packet. Accordingly, after the dummy PID detecting section 56a has detected a dummy packet for the first time, the dummy PID detecting section 56a may continue to search for dummy packets (or search for dummy PIDs) while the picture header detecting section 56b is searching for I-picture headers. And if the dummy PID detecting section 56a has detected a dummy packet after the I-picture header has been detected and before the next picture header is detected, then the dummy PID detecting section 56a notifies the picture header detecting section 56b of that detection and makes the detecting section 56b output the second detection signal, thereby turning the switch 55 OFF. Thereafter, Step S73 and following processing steps may be carried out.

The data processor of the preferred embodiment described above inserts dummy packets with a particular dummy identifier into connection points of a data stream, which has been read out for playback, and at predetermined intervals, thereby eliminating decoding errors just as intended. Accordingly, no special processing such as buffer clearing needs to be carried out to avoid errors. Then, the data processor sequentially acquires only required picture data by detecting picture headers, thereby decoding and outputting I-pictures continuously without causing any processing delay.

Embodiment 2

Hereinafter, an application of the processing of the first preferred embodiment will be described as a second specific preferred embodiment.

FIG. 8 shows an arrangement of functional blocks in a data processor 80 according to this preferred embodiment. If there are a number of receivable TS as in digital broadcasting, for example, then the data processor 80 has the function of retrieving one scene from each single TS while switching the TS and presenting all of those scenes as a list of smaller pictures on the same screen, i.e., a channel search function.

The data processor 80 includes a receiving section 81, a channel selecting section 82, a dummy packet replacing section 83, a control section 84, a particular data detecting section 86, the switch 55, the TS/PES decoder 57, the decoding section 58, and the output interface 59. In FIG. 8, any component having the same function as the counterpart of the data processor 50 shown in FIG. 5 is identified by the same reference numeral as that used in FIG. 5.

The receiving section 81 may be an antenna, for example, which can selectively receive one of a plurality of receivable TS, and outputs the received TS as a digital signal. The channel selecting section 82 selects a particular one of the TS. Those TS transmitted concurrently have mutually different identifiers (TS-IDs). Thus, the channel selecting section 82 can select any necessary TS according to those identifiers. It should be noted that data about a plurality of programs or contents may be included in a single TS. However, for convenience sake, the following preferred embodiment will be described on the supposition that data about only a single program is included in a single TS.

The dummy packet replacing section 83 replaces one of the received TS packets with a dummy packet as described for the first preferred embodiment. The data structure of the dummy packet is just as described for the first preferred embodiment. In the first preferred embodiment, no packets within the given stream are changed but the dummy packets are just inserted thereto. Meanwhile, some packets are "replaced" in this preferred embodiment because the broadcast TS is received as a so-called "push input". That is to say, the timing of reception is not controllable, and the dummy packets are not insertable, for the data processor 80 on the receiving end.

The control section 84 controls the operations of the channel selecting section 82 and the dummy packet replacing section 83, thereby specifying the TS to select and the TS packet to be replaced with a dummy packet. This decision is made on receiving a second detection signal, showing that a picture header other than an I-picture header has been detected, from the picture header detecting section 86b to be described later. More specifically, on receiving the second detection signal, the control section 84 instructs the channel selecting section 82 to change (or switch) the TS and the dummy packet replacing section 83 to replace the packet with a dummy packet, respectively. The packet to be replaced may be next to the packet with the detected picture header, because if the same packet were replaced, that packet might include I-picture data.

The particular data detecting section 86 includes the dummy PID detecting section 56a and the picture header detecting section 86b. The operation and function of the dummy PID detecting section 56a are just as already described for the first preferred embodiment. On the other hand, the picture header detecting section 86b may have the same function as the picture header detecting section 56b of the first preferred embodiment described above. For example, the picture header detecting section 86b may also output the first detection signal on detecting an I-picture header code and the second detection signal on detecting the picture header code of the next picture after having detected the I-picture header code, respectively. These functions are just as already described on the picture header detecting section 56b and see the description of the picture header detecting section 56b for further details. The picture header detecting section 86b also sends a signal, representing the type of the picture header code detected, to the control section 84.

The operations and functions of the switch 55, TS/PES decoder 57, decoding section 58 and output interface 59 are just as already described on the data processor 50 of the first preferred embodiment, and the description thereof will be omitted herein.

Hereinafter, the processing done by the data processor 80 of this preferred embodiment will be described with reference to FIG. 9. Portions (a) through (c) of FIG. 9 show TS 91a through 91c, which can be received and selected by the data processor 80. Specifically, the TS 91a includes data about a program content on Channel A, the TS 91b includes data about a program content on Channel B, and the TS 91c includes data about a program content on Channel C. Suppose the receiving section 81 and the channel selecting section 82 are now receiving the TS 91a. At this point in time, the switch 55 is supposed to be open and the TS 91a not transmitted to the TS/PES decoder 57.

The TS 91a is transmitted to the particular data detecting section 86 by way of the receiving section 81, channel selecting section 82 and dummy packet replacing section 83. In this case, the dummy packet replacing section 83 receives the TS 91a but outputs it as it is without modifying it at all. It should be noted that the output stream of the dummy packet replacing section 83 will also be referred to herein as a "playback stream" as in the first preferred embodiment, no matter whether the stream has been modified or not. The dummy PID detecting section 56a of the particular data detecting section 86 searches the PIDs of this TS packet. However, since there are no dummy packets there, the dummy PID detecting section 56a outputs no signals at all.

The picture header detecting section 86b of the particular data detecting section 86 receives and searches the playback stream, thereby detecting the picture header of an I-picture chA-I1. Then, the picture header detecting section 86b outputs the first detection signal to the switch 55, thereby closing the switch 55.

When the TS packet, including the data about the I-picture chA-I1, has been received fully, the picture header of another picture (which is supposed to be a B-picture in this example) will appear in the TS 91a. On detecting the picture header code of the B-picture from the TS 91a, the picture header detecting section 86b outputs the second signal. In response, the switch 55 is opened and only the picture data of the I-picture chA-I1 of the TS 91a gets stored in the buffer memory 58a by way of the TS/PES decoder 57.

The second signal is also transmitted to the control section 84. In response to the second signal received, the control section 84 instructs the dummy packet replacing section 83 to insert a dummy packet. In accordance with this instruction, the dummy packet replacing section 83 replaces one of the packets, following the packet with the picture header of the B-picture, with a dummy packet. Portion (d) of FIG. 9 shows a video packet sequence (playback stream) 92 to be input to the switch 55. It can be seen that the dummy packet 93 is provided after the I-picture chA-I1 of the TS 91a. It should be noted that the TS packet to be replaced with the dummy packet stores data other than the I-picture data required. Thus, no problem will arise even if the packet is replaced with the dummy packet.

The control section 84 also instructs the channel selecting section 82 to switch Channel A into Channel B. In accordance with this instruction, the channel selecting section 82 selects and outputs the TS 91b. As shown in portion (d) of FIG. 9, a packet sequence of the TS 91b is output after the dummy packet 93.

This dummy packet 93 is detected by the dummy PID detecting section 56a. The dummy PID detecting section 56a outputs a dummy PID detection signal to the picture header detecting section 86b. In response, the picture header detecting section 86b searches the playback stream for the picture header code of an I-picture of the TS 91b. And on detecting the picture header code of the I-picture ChB-I2, the picture header detecting section 86b outputs the first detection signal to the switch 55. Thereafter, on detecting the picture header code of the next picture that follows the I-picture ChB-I2, the picture header detecting section 86b outputs the second detection signal to the switch 55 and the control section 84. As a result, the dummy packet replacing section 83 replaces one of the TS packets, following the TS 91b, with a dummy packet 94 and the channel selecting section 82 selectively outputs a TS 91c on Channel C.

Similar processing is carried out on the TS 91c, too. A TS packet, following the TS packet in which the data about an I-picture chC-I3 is stored, is replaced with a dummy packet 95 and the resultant modified playback stream is output.

The playback stream is generated and the first and second detection signals are output as described above. Accordingly, only the I-picture data of the respective TS 91a through 91c are sequentially input to the decoding section 58. Portion (e) of FIG. 9 shows the I-picture data of respective TS to be input to the buffer memory 58a. By decoding these I-picture data, reducing their size to a predetermined one and presenting part or all of them on the same screen, the contents of the programs on respective channels can be displayed as a list.

In the preferred embodiment described above, data about only one program is supposed to be stored in a single TS. However, if data about a plurality of program contents is stored in a single TS, then a data stream about the respective program contents can be obtained by extracting the program association table packet (PAT_TSP) and program map table packet (PMT_TSP) shown in FIG. 2. Specifically, suppose the program number (or channel number) of a requested program is X. First of all, the TS packets are searched for a program association table packet. The packet ID (PID) of the program association table packet may be zero, for example. Accordingly, a packet having that value may be searched for. In the program association table in the program association table packet, respective program numbers and the PIDs of program map table packets for respective programs, associated with those program numbers, are stored. Thus, the packet ID (PID) of the program map table PMT, associated with the program number X, can be located. The PID of the program map table PMT is supposed to be XX.

Next, when the program map table packet with PID=XX is extracted, a program map table associated with the program number X can be obtained. In the program map table PMT, the PIDs of TS packets, including audiovisual information that makes up each program to view or listen to, are stored on a program-by-program basis. As for the program number X, for example, the PID of its video information may be XV and that of its audio information may be XA. By using the PID (=XV) of the packet storing the video information and the PID (=XA) of the packet storing the audio information obtained in this manner, video and audio packets about a particular program content can be extracted from a single TS.

As is clear from the foregoing description, even if the data about a plurality of program contents are stored in a single TS, each of those contents can be identified. Accordingly, the statement of the preferred embodiment described above, in which each TS stores a single program content, is equally applicable to such a situation, too.

First and second preferred embodiments of the present invention have been described. In each of those preferred embodiments, only I-picture data is supposed to be extracted based on the picture header code of an I-picture and that of the next picture that follows the I-picture.

Optionally, however, the intermittent playback may also be carried out by extracting a certain range of the content to play back, not on the picture-by-picture basis as described above. For example, the picture header detecting section 86*b* may output a first detection signal on detecting an I-picture header code and then output a second detection signal on detecting an $N^{th}$ (where N is a natural number) I-picture header code. Then, a portion of the given content, including a number N of I-pictures, may be extracted. For example, by setting N to 4, that range is played back for about 2 seconds.

Alternatively, the picture header detecting section 86*b* may also output a first detection signal on detecting video sequence information (i.e., a sequence header) or group of pictures structure information (i.e., a GOP header) complying with an MPEG standard and then output a second detection signal on detecting the next sequence header or GOP header. Then, a portion of the given content, including video object units (VOBs) or groups of pictures (GOPs) complying with the MPEG standard, can be extracted. It should be noted that the sequence headers and GOP headers are stored as portions of the video data 30*b*.

As another alternative, in processing video or audio data in alignment with PES packets, the picture header detecting section 86*b* may output a first detection signal on detecting a PES header code and then output a second detection signal on detecting an Nth PES header code. Then, the present invention is also applicable to video or audio intermittent playback.

It should be noted that any of the various types of headers described above may be used arbitrarily. That is to say, by using either any one of the picture header code, PES header code, sequence header code and group of pictures (GOP) header code or at least two of them in combination, the picture header detecting section 86*b* may output first and second detection signals. For example, the detecting section 86*b* may output the first and second detection signals by using a picture header code for some portion of the given content and a group of pictures (GOP) header code for another portion thereof, respectively.

The playback function of the data processor may be carried out on a computer program that defines the processing procedure shown in FIG. 7. That is to say, a computer including the data processor can operate the respective components of the data processor and perform the processing described above by executing such a computer program. The computer program may be stored on a storage medium such as a CD-ROM and put on the market or downloaded via telecommunications lines such as the Internet. Then, a computer system may operate as a player having the same function as the data processor described above.

INDUSTRIAL APPLICABILITY

The present invention provides a data processor that can play back a data stream, obtained by connecting a number of data streams together, without erroneously recognizing a data sequence at any connection point thereof. This data processor can quickly reach the location of data to read and extract only data required for the playback by inserting dummy data thereto. Consequently, playback is realized with no processing delays.

The invention claimed is:

1. A data processor for receiving a data stream, including a plurality of packets, and playing back a content concurrently based on content data stored in the packets, each said packet having an identifier, the content data including a first code, which specifies a data location of a first portion of the content, and a second code, which specifies a data location of a second portion thereof, the data processor comprising:

a dummy packet processing section, which makes a plurality of dummy packets, each having a dummy identifier that is different from any of the identifiers of the packets, and which generates a playback stream, including the dummy packets at predetermined intervals, based on the data stream received;

a detecting section for detecting any of the dummy identifiers by scanning the identifiers of the respective packets of the playback stream and then outputting a first detection signal upon detecting the first code and a second detection signal upon detecting the second code, respectively;

a switch, which receives the playback stream and which selectively passes the content data representing the first portion of the content in accordance with the first and second detection signals; and a decoding section for playing back the first portion of the content based on the output of the switch, wherein the dummy packet processing section generates the playback stream by inserting the dummy packets into the data stream at time intervals as defined by the playback duration of a given picture.

2. The data processor of claim 1, wherein after having detected the second code, the detecting section detects the next dummy identifier by scanning the identifiers of the respective packets.

3. The data processor of claim 1, further comprising an extracting section for continuously extracting, as a plurality of partial streams, a number of portions of at least one data stream from a storage medium on which the data stream is stored, wherein the dummy packet processing section inserts the dummy packet with the dummy identifier into each data location at which two of the partial streams are connected together.

4. The data processor of claim 1, wherein the dummy packet processing section generates the playback stream by inserting the dummy packet into the data stream upon the detection of the second code.

5. The data processor of claim 1, wherein the data processor receives at least two data streams, each having the content data about a program, and wherein the data processor further includes a channel selecting section for selecting one of the data streams, and wherein upon the detection of the second code, the channel selecting section switches a first data stream, which has been received until the second code is detected, into a second data stream, and wherein the dummy packet processing section generates a playback stream in which the dummy packet is provided at a data location where the first data stream is switched into the second data stream.

6. The data processor of claim 5, wherein the dummy packet processing section generates the playback stream by replacing the packets of the first data stream, which follow the packet with the second code, by the dummy packets and then connecting the second data stream to the first data stream.

7. The data processor of claim 1, wherein the data stream includes compressed content data, and
wherein the decoding section plays back the first portion of the content by decoding the content data.

8. The data processor of claim 7, wherein the content is related to video to be presented by switching a plurality of pictures one after another, the content data having been compressed by a bidirectional predictive coding method, and
wherein the detecting section detects a picture header code of an I-picture as the first code and a picture header code of the next picture, following the I-picture, as the second code, respectively.

9. The data processor of claim 1, wherein the detecting section detects, as the first code, at least one of a picture header code, a PES header code, a sequence header code, and a group of pictures (GOP) header code, and, as the second code, the same type of code as the first code, respectively.

10. A data processing method for receiving a data stream, including a plurality of packets, and playing back a content concurrently based on content data stored in the packets,
each said packet having an identifier, the content data including a first code, which specifies a data location of a first portion of the content, and a second code, which specifies a data location of a second portion thereof,
the method comprising the steps of:
making a plurality of dummy packets, each having a dummy identifier that is different from any of the identifiers of the packets;
generating a playback stream, including the dummy packets at predetermined intervals, based on the data stream received;
detecting any of the dummy identifiers by scanning the identifiers of the respective packets of the playback stream and then outputting a first detection signal upon detecting the first code and a second detection signal upon detecting the second code, respectively;
receiving the playback stream and selectively passing the content data representing the first portion of the content in accordance with the first and second detection signals; and
playing back the first portion of the content based on the output of the switch,
wherein the step of generating the playback stream includes generating the playback stream by inserting the dummy packets into the data stream at time intervals as defined by the playback duration of a given picture.

11. The data processing method of claim 10, wherein the step of outputting the detection signals includes detecting the next dummy identifier by scanning the identifiers of the respective packets after having detected the second code.

12. The data processing method of claim 10, further comprising the step of continuously extracting, as a plurality of partial streams, a number of portions of at least one data stream from a storage medium on which the data stream is stored,
wherein the step of generating the playback stream includes inserting the dummy packet with the dummy identifier into each data location at which two of the partial streams are connected together.

13. The data processing method of claim 10, wherein the step of generating the playback stream includes generating the playback stream by inserting the dummy packet into the data stream upon the detection of the second code.

14. The data processing method of claim 10, wherein there are at least two data streams to receive, each said data stream having the content data about a program, and
wherein the data processing method further includes the step of selecting one of the data streams, and
wherein the step of selecting includes switching a first data stream, which has been received until the second code is detected, into a second data stream upon the detection of the second code, and
wherein the step of generating the playback stream includes generating a playback stream in which the dummy packet is provided at a data location where the first data stream is switched into the second data stream.

15. The data processing method of claim 14, wherein the step of generating the playback stream includes generating the playback stream by replacing the packets of the first data stream, which follow the packet with the second code, by the dummy packets and then connecting the second data stream to the first data stream.

16. The data processing method of claim 10, wherein the data stream includes compressed content data, and
wherein the step of playing includes playing back the first portion of the content by decoding the content data.

17. The data processing method of claim 16, wherein the content is related to video to be presented by switching a plurality of pictures one after another, the content data having been compressed by a bidirectional predictive coding method, and
wherein the step of outputting the detection signals includes detecting a picture header code of an I-picture as the first code and a picture header code of the next picture, following the I-picture, as the second code, respectively.

18. The data processing method of claim 10, wherein the step of outputting the detection signals includes detecting, as the first code, at least one of a picture header code, a PES header code, a sequence header code, and a group of pictures (GOP) header code, and, as the second code, the same type of code as the first code, respectively.

* * * * *